United States Patent [19]

Osman

[11] Patent Number: 5,495,580
[45] Date of Patent: Feb. 27, 1996

[54] RING NETWORK SECURITY SYSTEM WITH ENCODING OF DATA ENTERING A SUBNETWORK AND DECODING OF DATA LEAVING A SUBNETWORK

[75] Inventor: Fazil Osman, Escondido, Calif.

[73] Assignee: XLNT Designs, Inc., San Diego, Calif.

[21] Appl. No.: 963,726

[22] Filed: Oct. 20, 1992

[51] Int. Cl.⁶ .............................. H04J 3/02; H04L 12/42; H04L 12/46

[52] U.S. Cl. .................. 395/187.01; 395/200.21; 364/DIG. 1; 364/242.94; 364/242.95; 364/DIG. 2; 364/935.51; 364/940.63

[58] Field of Search .................. 395/200, 187.01, 395/200.02, 200.21; 380/48

[56] References Cited

U.S. PATENT DOCUMENTS

| | | | |
|---|---|---|---|
| 4,160,120 | 7/1979 | Barnes et al. | 178/22 |
| 4,341,925 | 7/1982 | Doland | 178/22.17 |
| 4,386,416 | 5/1983 | Giltner et al. | 395/200 |
| 5,161,192 | 11/1992 | Carter et al. | 380/48 |
| 5,177,788 | 1/1993 | Schanning et al. | 380/23 |
| 5,235,644 | 8/1993 | Gupta et al. | 380/48 |
| 5,251,203 | 10/1993 | Thompson | 370/13.1 |
| 5,329,623 | 7/1994 | Smith et al. | 395/275 |
| 5,371,852 | 12/1994 | Attanasio et al. | 395/200 |

Primary Examiner—Thomas C. Lee
Assistant Examiner—D. Dinh
Attorney, Agent, or Firm—Fish & Richardson

[57] ABSTRACT

A system for securing communications between devices connected to a ring network. In accordance with the present invention, when a message frame is passed around the ring network, a gate keeper circuit associated with at least one port of a hub determines whether the message frame is intended for any of the nodes connected to that port. If the message frame is not intended for any of the nodes connected to that port, the message frame is encoded before it exits the hub through the port to traverse the subnetwork connected to the port, and decoded after it reenters the hub through the port. If and only if at least one node on the subnetwork connected to the port is intended to receive the message frame, then each node connected to that port can read the message frame.

16 Claims, 7 Drawing Sheets

RING NETWORK SECURITY SYSTEM WITH ENCODING OF DATA ENTERING A SUBNETWORK AND DECODING OF DATA LEAVING A SUBNETWORK

BACKGROUND OF THE INVENTION

1. Field of the Invention

This invention relates to computer communication networks, and more particularly to a system for securing communications between devices connected to a ring network.

2. Description of Related Art

As computers become increasingly relied upon to perform diverse functions, the necessity to share information and resources between computers is also increasing. Computer networks are a common means for accomplishing the necessary interconnection between computers which allow such sharing to take place. Computer networks allow one computer or terminal (a "node") to pass information to another computer or terminal ("node") for the purpose of performing operations for which the receiving node is more appropriate. Additionally, information may be passed from local nodes to central processing and storage centers. An example of such a network is the automatic teller machines (ATMs) installed at many banks today.

One of the biggest concerns of managers of such networks, after network operational availability ("uptime"), is ensuring the security of the network, i.e., protecting the network from intentional penetration by unauthorized users. There are many ways to provide security for networks. The effectiveness of most of these security means depends upon the configuration of the particular network to be secured. One known means for securing a network is to provide end-to-end encryption. Such end-to-end encryption requires each message that is transmitted from one node on the network to another node on the network to be encrypted such that only authorized nodes can send and receive messages. The receiving node, upon receipt of an encrypted message, must decode the message based upon the encoding method used. However, use of such an end-to-end encryption scheme is costly, difficult to manage, and slow. A preferred method is to have the network provide the security means.

Networks often comprise multiple subnetworks having bridges and routers interconnecting them. Security can be added to the bridges and routers such that they do not allow unauthorized traffic onto a network. However, this does not prevent a node from receiving messages that are not intended for that node. The problem of preventing unauthorized nodes from receiving messages intended only for authorized nodes is a substantial one, since "snooping" using an unauthorized node could reveal very sensitive information, including user passwords and file contents being transferred across the network. For example, a disgruntled employee who legitimately has access to the network may gain much greater access than necessary. This could unnecessarily jeopardize highly sensitive information. This problem is exacerbated by the ease with which network analyzers and other low-cost network monitoring devices can be obtained and connected to networks having hubs with ports which interconnect subnetworks of nodes within the network. Connection of such network monitoring devices permits an intruder to monitor the traffic on the network and decode the higher layer protocols (usually available from the analyzer). This would allow an intruder, for example, to do such things as monitor specific conversations between users and hosts as users log-on, revealing to the intruder the users' passwords and other information necessary to log-on to hosts.

An approach to the security problem which is less cumbersome than end-to-end encryption is implemented in bussed network configurations, such as Ethernet. FIG. 1 illustrates the configuration of a typical bussed network. All incoming data from any port 101 of the hub 100 that is transmitting is put onto the hub bus 102 in the form of frames, and then broadcast out to all the ports 101 on port busses 105. To provide security, a "thrasher" circuit 103 is inserted between the hub's bus 102 and each port 101. The hub 100 determines the address(es) of the nodes 104 on a particular port 101*a*. When a frame is to be transmitted out onto that port 101*a*, the thrasher circuit 103*a* coupled to that port compares the destination of the frame with the nodes 104 connected to that port 101*a*. If the port 101*a* is connected to a node or nodes 104 which are intended to receive the frame (e.g., the frame is addressed to one or more nodes, the frame is a multicast intended for all nodes 104, or the frame is a management frame) the frame is transmitted; otherwise the thrasher circuit 103 "thrashes" the frame (i.e., makes it unintelligible before the frame is transmitted through port 101*a*). Hence, the thrasher circuit 103*a* ensures that nodes connected to the port 101*a* can only read frames that are authorized for the nodes of that port 101*a*.

While this solution provides added security in bussed networks, it is not possible to implement the thrasher circuit described above in ring networks or other shared media access networks in which a node inspects and possibly modifies information before it is transmitted to a next node sharing the media, hereinafter called a ring. FIG. 2 is an illustration of a prior art ring network. In ring networks, all nodes 204 are daisy-chained such that a message frame must go through each node 204 in a sequential manner. Hence, if a frame is thrashed by a thrasher circuit associated with a port 201 of a hub 200, it will be thrashed for all other nodes 204 associated with other ports 201 that are connected to the network further downstream.

Thus, there remains a need for a security system that is compatible with ring networks and which does not rely upon end-to-end encryption of the message. The present invention provides a fast, inexpensive, and easily implemented security system that fills this need.

SUMMARY OF THE INVENTION

The present invention is a security system for ring networks that provides security at the hub level, thus providing the network manager with a means to secure the network which is inaccessible to the user. The inventive system is used in ring networks comprising hubs having one or more ports to which one or more nodes are serially connected in a daisy-chain fashion, forming a "subnetwork". The inventive system comprises a gatekeeper circuit associated with each port of each network hub.

In the illustrated embodiment, information in a ring network is formatted as a frame having a header field containing the address of the destination node and the source node, a data section containing the particular information being transmitted, and a trailer section preferably containing an error detection code, such as a cyclical redundancy checking (CRC) code and is passed in one direction from one node to another along the ring. When information is taken into a hub, it is transmitted to a first port. The first port then passes the frame to the first node connected to that port.

Assuming that only one node is connected to the first port, the node transmits the frame back to the port to be passed to the next port within the hub. This process continues until the frame has gone through each node in each subnetwork of the hub. When more than one hub is connected to the ring network, the frame is transmitted to the next hub on the ring. The above process is repeated for each hub in the ring. In the preferred embodiment of the present invention, more than one message frame may be circulating through the network at any one time.

In accordance with the present invention, each port is coupled to a gate keeper circuit that includes an address detector circuit, a scrambler circuit, a descrambler circuit, a pseudo-random binary sequence (PRBS) generator, and preferably an error detection code (EDC) circuit. The gate keeper circuit determines whether the frame is intended for any node in the subnetwork connected to the associated port. If the frame is not intended for any of the nodes of the subnetwork connected to the associated port, the scrambler circuit encodes the data field of the frame. The encoding may be very simple, such as "Exclusive-ORing" (XOR'ing) the data section of the frame with a randomly generated word, or a more sophisticated method, such as the Data Encryption Standard (DES) algorithm. The error detection code, if present, is recalculated for the frame and only the data sections are encoded. If the error detection code is present and indicated an error prior to encoding, the error detection code is recalculated to indicate an error, thereby preserving the indication. Since other information, such as frame length, frame count, status indications, etc., carried in the frame is not encoded, such information remains correct. The frame is passed from one node of a subnetwork to the next node, until the frame is returned to the transmitting port. The gate keeper circuit for that port then determines whether the frame was encoded, and if so, returns the data section and error detection code to their original state.

The frame continues down the ring, being tested by the gate keeper circuit at each port to determine whether the frame is to be encoded by that port's scrambler circuit or not. Thus, the frame can only be read by the nodes connected to those particular ports to which at least one attached node is intended to receive the message. Devices connected to one port cannot read messages intended for nodes connected to other ports. Thus, the security of the system is enhanced.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 1:
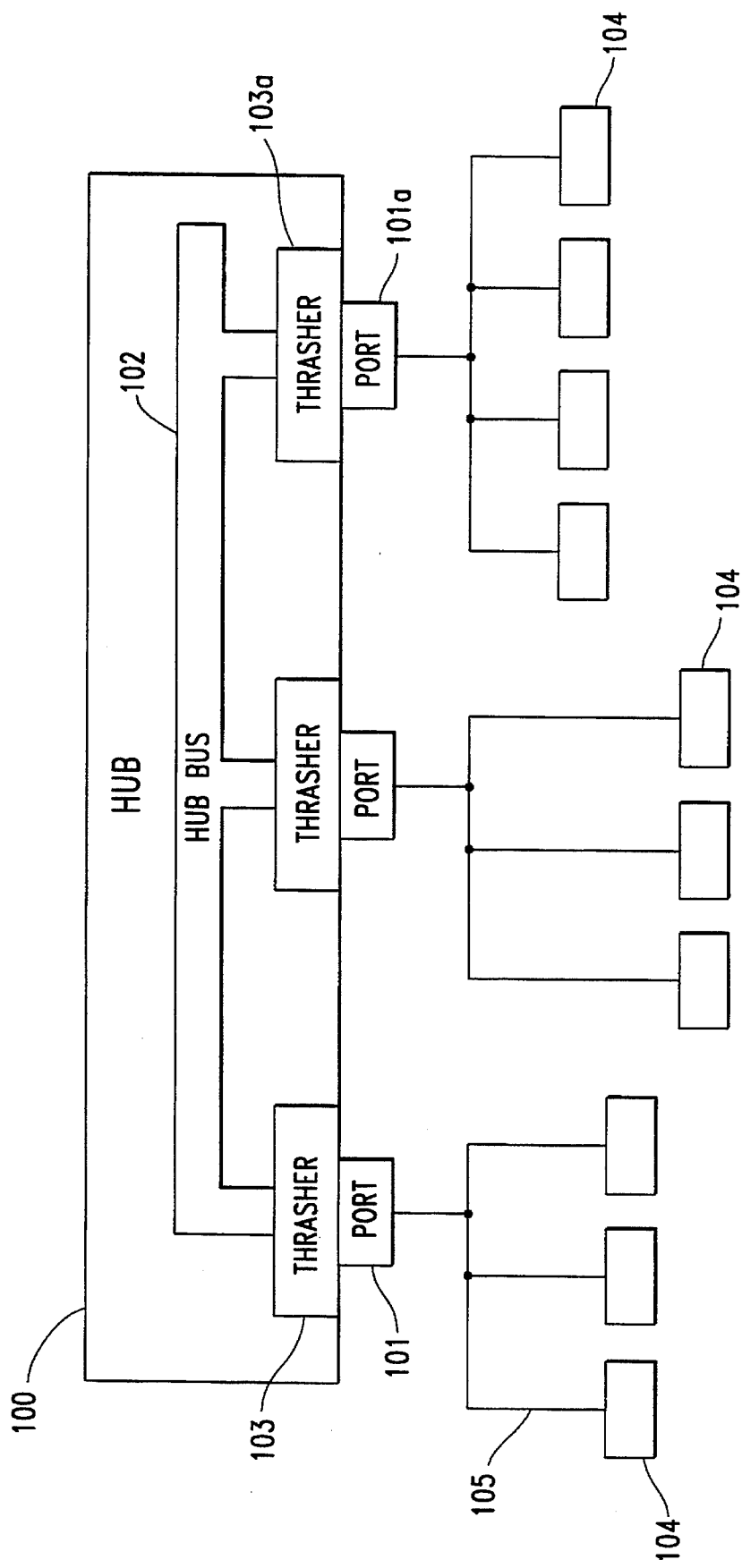
FIG. 1 is an illustration of a prior art bussed network.
Figure 2:
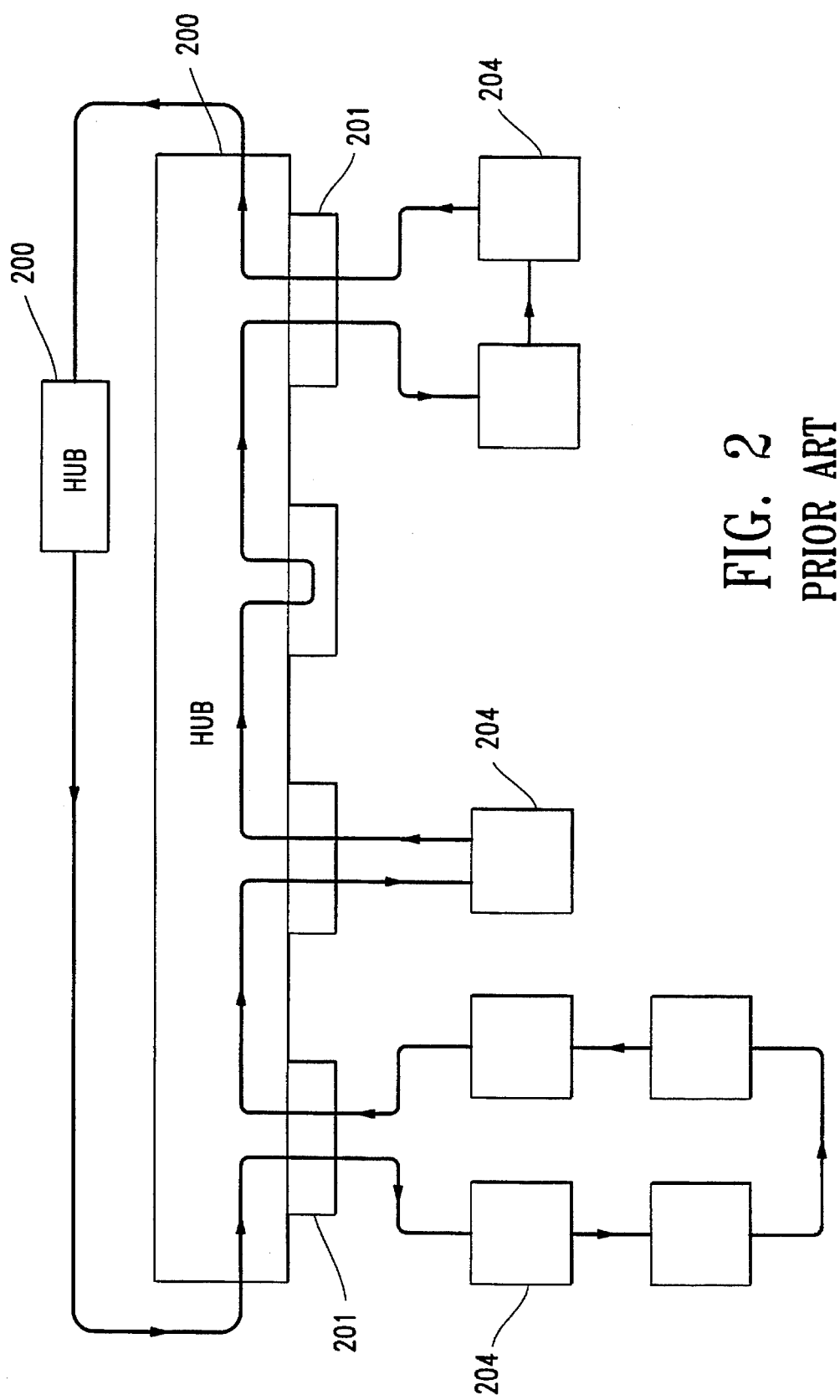
FIG. 2 is an illustration of a prior art ring network.
Figure 3:
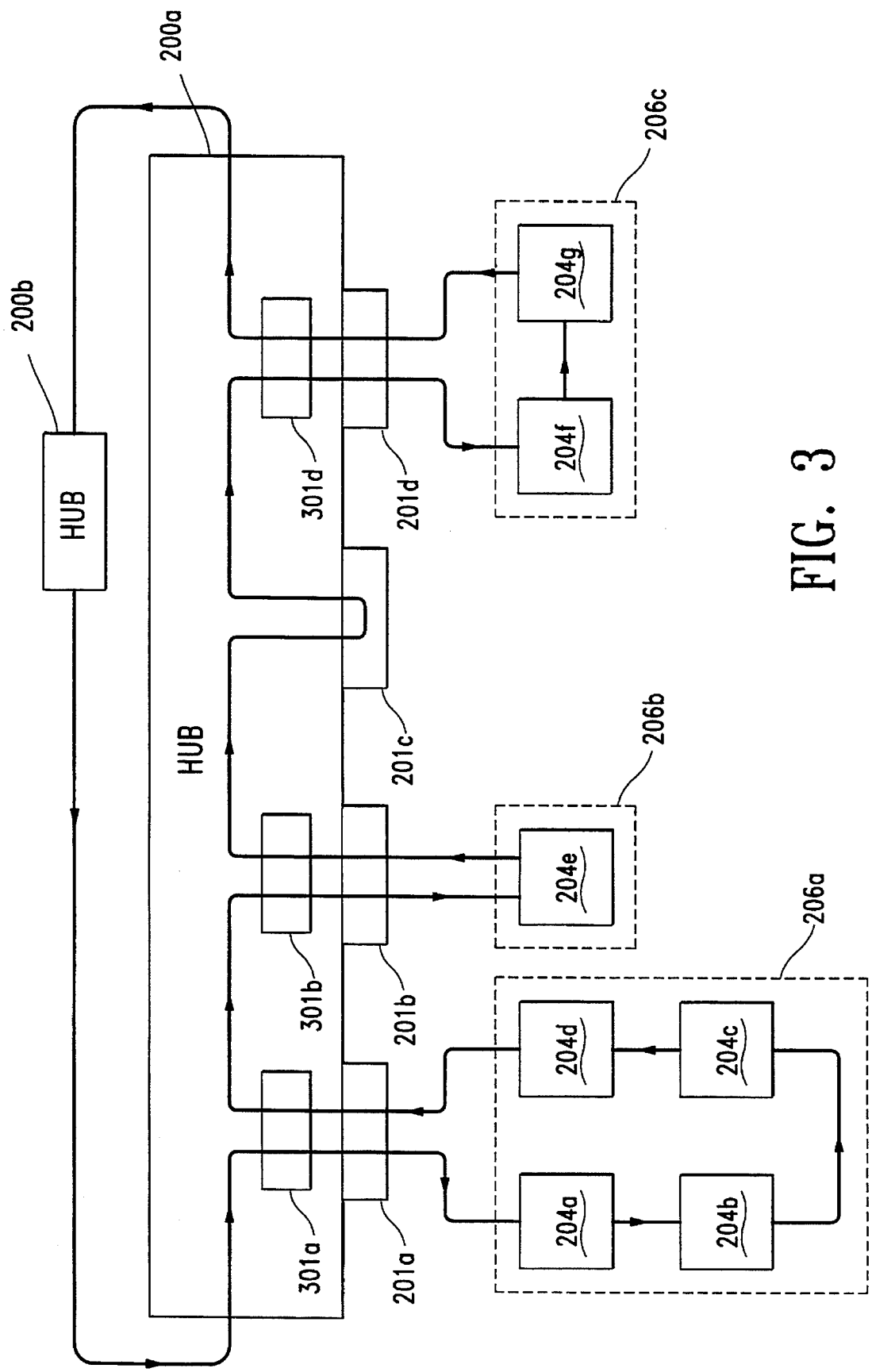
FIG. 3 is an illustration of the present invention as implemented in a ring network including hubs.

The present invention is a security system that is compatible with ring networks. Ring networks (sometimes referred to as "loop" networks) are well known in the art of computer interfacing and networking, as indicated in Distributed Micro/Minicomputer Systems (Structures, Implementation, and Application), Weitzman (Prentice-Hall, Inc. 1980, section 2.4). FIG. 3 is an illustration of the present invention as implemented in a ring network having a multiplicity of elements (such as nodes 204, hubs 200, and ports 201 within hubs 200) connected thereto. While the illustrated embodiment includes hubs 200 having ports 201 to which subnetworks 206 of nodes 204 are connected, it should be understood that the present invention can be used with any ring network configuration. Typically in ring networks, data flows around the ring network in only one direction. However, the invention is not limited only to ring networks in which data flows in one direction. In the present description, elements which receive data from a transmitting element are referred to as "downstream" from the transmitting element. Active subnetworks are considered to be those subnetworks which include at least one node.

In accordance with the present invention, when a message is passed around the ring network, a gate keeper circuit 301 associated with each port 201 of a hub 200 determines whether the message frame is intended for any of the nodes 204 connected to that port 201. If the message frame is not intended for any of the nodes 204 connected to that port 201, the message frame is encoded before it exits the hub 200 through the port 201 to traverse the subnetwork 206 connected to the port 201, and decoded after it reenters the hub 200 through the port 201. Thus, if and only if at least one node 204 on the subnetwork 206 connected to the port 201 is intended to receive the message frame, then each node 204 connected to that port 201 can read the message frame.

Details of the Invention

In the present invention, a gate keeper circuit 301 is coupled between the circuitry of the hub 200 and each port 201. Referring to the ring network shown in FIG. 3, adjacent nodes 204 may be connected to the ports 201 of the hubs 200. A node 204 may be any device that is capable of either sending data to, or receiving data from the network. The number of nodes 204 which may be connected to a particular port 201 depends upon the characteristics of the particular hub 200 and the network. Each node 204 has an address on the network. Hubs provide efficient means to expand a network and to manage very complex network structures more easily.

Messages circulate around the network in the form of a message frame. A message frame has a header section containing at least the address of the destination node to which the message frame is being sent, and optionally containing the address of the source node from which the message frame originated. More elaborate headers may also be used. Following the header is a data section, or field, containing the contents of the message frame. After the data section is a trailer section, preferably containing an error detection code (EDC), such as a cyclical redundancy checking (CRC) code. The trailer may also include an end symbol which indicates the end of the message frame. Additional information concerning the nature of the frame or the message within the frame may also be provided within the trailer.

Figure 4:
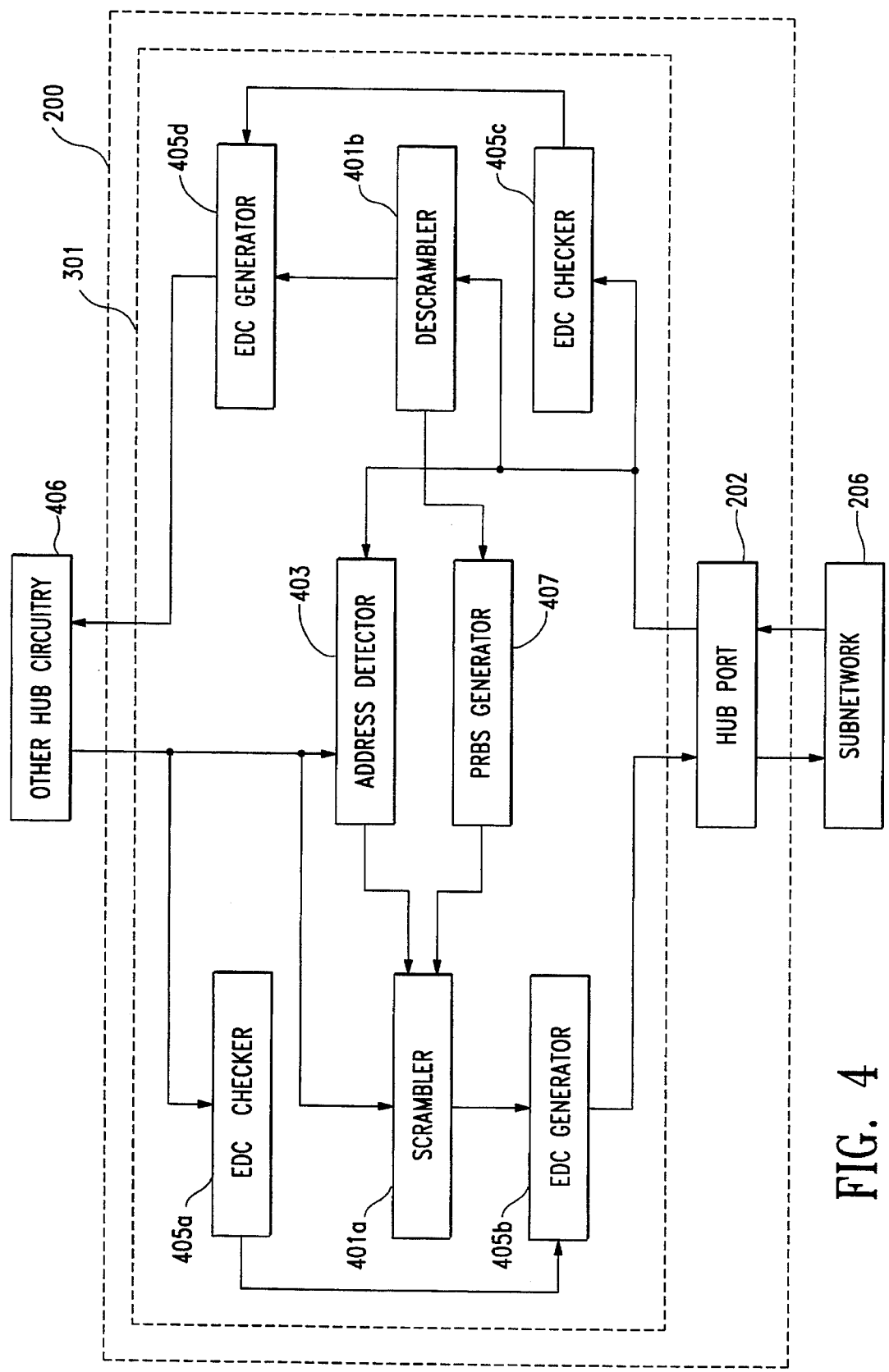
FIG. 4 is a block diagram of a gate keeper circuit in accordance with the present invention.

FIG. 4 is a block diagram of a preferred embodiment of a gate keeper circuit 301 in accordance with the present invention. The gate keeper circuit 301 includes a scrambler circuit 401a, a descrambler circuit 401b, an address detector circuit 403, EDC checker circuits 405a, 405c, EDC generator circuits 405b, 405d, and a pseudo-random binary sequence (PRBS) generator 407. Alternative embodiments of the present invention may not contain EDC checker circuits and EDC generator circuits. The address detector circuit 403 is coupled to, and receives message frames from, other hub circuitry 406. The address detector circuit 403 maintains, or has access to, a list of the addresses of the nodes 204 that are connected to the port 201 associated with the gate keeper circuit 301 of which the address detector circuit 403 is a part. The address detector circuit determines whether the message frame is intended for one of the nodes 204 coupled to the associated port 201. In one embodiment of the present invention, the address list used by the address detector circuit 403 is supplied by the hub 200. In an alternative embodiment of the present invention, the address list is learned by the gate keeper circuit 301. Which of these embodiments will be the preferred embodiment depends upon the security objectives for the network.

If the address detector circuit 403 determines that a message frame is not intended for any of the nodes 204 connected to the port 201 associated with the gate keeper circuit 301, then the message frame is transmitted to the scrambler circuit 401a. The scrambler circuit 401a of the preferred embodiment of the present invention is coupled to the PRBS generator circuit 407, which generates a PRBS encoding word. The encoding word is transmitted to the scrambler circuit 401a which "Exclusive-ORs" (XORs) the data field of the message frame with the encoding word. The descrambler circuit 401b decodes messages by XORing the encoded message with the same PRBS encoding word used by the scrambler circuit 401a. This provides a fast and simple means to encode the data field of the message frame in such a manner that the data is unintelligible without knowledge of the encoding word. The PRBS encoding word may be changed periodically to enhance security. For example, the encoding word in a token ring can be changed each time the token is lost and the ring goes through an initialization sequence to generate a new token.

The EDC generator circuit 405b recalculates the EDC for the message frame after the encoding and replaces the previously calculated EDC with the newly calculated EDC. Therefore, each node 204 that receives a message frame in which the data field has been encoded can still detect errors that occur in the transmission of the message frame to the node 204. Furthermore, since only the data field is encoded (i.e., the trailer and header fields are not encoded), the protocol information necessary to perform diagnostic and statistical tracking, as well as the information necessary to move the frame around the ring network, are not effected by the encoding. In the preferred embodiment of the present invention, when a message frame is found by the EDC checker circuit 405a to have an error, an indication is provided to the EDC generator circuit 405b. The EDC generator circuit 405b ensures that the EDC code generated for the scrambled message indicates that an error exists. In a similar manner, when a scrambled message frame having an error is received by the EDC checker circuit 405c an indication is provided to the EDC generator circuit 405d to ensure that the indication that an error exists is preserved when the message is decoded and the new EDC code is generated. Messages may be pipelined through the network. Therefore, the scrambler circuit 401a and the descrambler circuit 401b may be concurrently operating on different messages or the same message.

An example of the manner in which a message frame circulates around the network is provided to further aid in understanding the function of the gate keeper circuit 301 of the present invention. Referring to FIG. 3, assume that a node 204e is the intended destination of a message frame from source node 204g. The message is formatted in a frame having a header field containing the address of the destination node 204e and the source node 204g, a data field having the information to be conveyed to the destination node 204e, and a trailer section having the EDC and end symbol. When allowed by the media access protocol of the ring, the source node 204g transmits the message frame to the ring. The message frame is received by hub 200a at port 201d and conveyed to the gate keeper circuit 301d. The address detector circuit 403 determines that the source of the frame is on port 201d, so it is not modified by the descrambler 401b or EDC generator 405d. The frame is then transmitted by hub 200a to hub 200b, where it is encoded and decoded in the same way as the following description for gate keeper 301a and port 201a.

Upon receiving the start of the message frame from the hub 200b, the hub relays the message frame to the gate keeper circuit 301a. The message frame enters the gate keeper circuit 301a and is inspected by the address detector circuit 403 within the gate keeper circuit 301a (see FIG. 4). The address detector circuit 403 determines whether the message frame is intended for a node 204a, 204b, 204c, 204d of the subnetwork 206a connected to the port 201a. Since the message frame in this example is not intended for any of the nodes 204a–204d of the subnetwork 206a, the data field of the message frame is scrambled by scrambler circuit 401a. EDC circuit 405b generates a new EDC for the encoded message frame. The new EDC replaces the EDC that was formally held in the trailer field of the frame, thereby preventing the error correction and detection systems within each node from being affected by the encoding of the data section. The message frame is then transmitted out through the port 201a.

From the port 201a, the message frame circulates around the ring network to the first node 204a of the subnetwork 206a. Because the data field of the message frame has been encoded, the data cannot be interpreted by the node 204a. However, the header field and trailer field have not been encoded and are read by the node 204a. The node 204a reads the address of the destination node 204e and determines that the message frame is not intended for the node 204a. The message frame is coupled from the node 204a back to the ring network, and circulates to each node 204b–204d on the subnetwork 206a. Each node 204b–204d in turn determines that the message frame is not intended for that node 204, and sends the message frame downstream to the next node on the network.

The message frame is returned from the node 204d through the port 201a to the gate keeper circuit 301a. The address detector circuit 403 within the gate keeper circuit 301 receives the message frame and again determines that the message frame was not sourced by, or not intended for, the nodes 204a–204d connected to the port 201a. Therefore, the address detector circuit 403 couples the message frame to the descrambler circuit 401b to be decoded. When the message frame has been decoded, the new EDC generated for the message frame replaces the EDC that was formally held in the trailer field of the message frame. The EDC circuit 405d transmits the message frame to the other hub circuitry 406. The message frame is then transmitted to a second gate keeper circuit 301b, which is coupled to the next port 201b.

The message frame is transmitted to the address detector circuit 403 within the second gate keeper circuit 301b. The address detector circuit 403 determines that the message frame is intended for the node 204e which is on the subnetwork 206b coupled to the port 201b. Therefore, the message frame is not to be encoded, and the message frame is not modified by the scrambler 401a or EDC generator 405b as it is transmitted.

In the preferred embodiment, after copying, the frame is transmitted by the destination node 204e with the message frame intact. The message frame continues around the network until it arrives at the source node, where it is removed from the network. Alternatively, the frame is removed from the ring network by the destination node 204e.

In the illustrated embodiment of the present invention, encoding consists of "Exclusive-ORing" (XOR'ing) the data field with a PRBS generated by a PRBS generator 407 within either the scrambler or descrambler circuit 401. The same PRBS encoding word is used to decode the data field. The PRBS is only known to the scrambler and descrambler circuits 401. Therefore, the message frame contents contained in the data field of the frame are unintelligible to the nodes 204 of ports 201 which do not have a node 204 for which the message frame is intended.

Figure 5A:
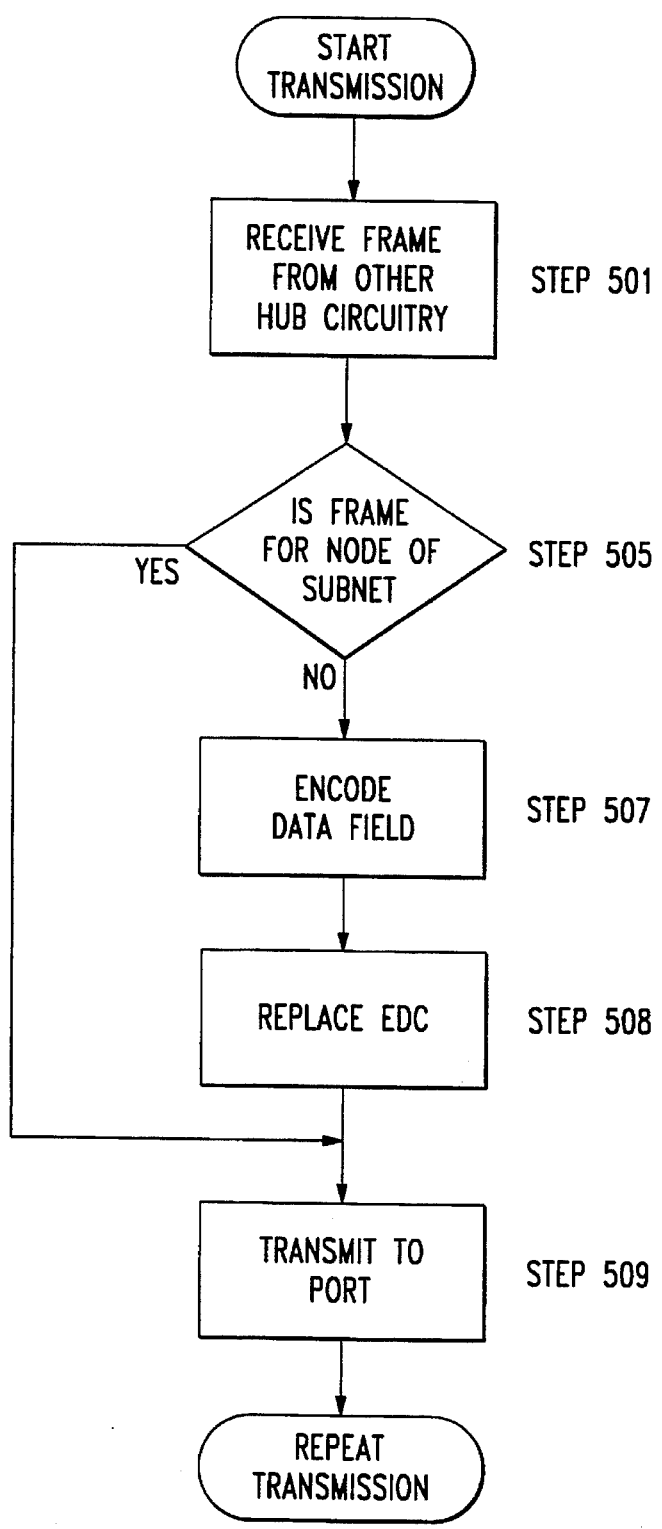
FIG. 5a is a flow chart of the steps of the inventive method for receiving a message frame in the gate keeper circuit from a hub within a ring network.

FIG. 5a is a flow chart of the steps of the inventive method for receiving a message frame in the gate keeper circuit 301b from a hub within a ring network. Initially, a message frame is received by a hub 200a within the network. The message frame is transmitted to the gate keeper circuit 301a associated with the first port 201a within the hub 200a (STEP 501). The gate keeper circuit 301a determines whether the message frame is intended for any of the adjacent nodes 204a–204d, within the subnetwork 206a that is coupled to the first port 201a (STEP 505). If the message frame is not intended for any of the nodes 204a–204d within the subnetwork 201a, the data field of the message frame is encoded by the gate keeper circuit 301a (STEP 507), and the EDC is replaced (STEP 508). Otherwise, the data field of the message frame is not encoded. The frame is then passed to port 201a (STEP 509) for transmission on subnetwork 206a.

Figure 5B:
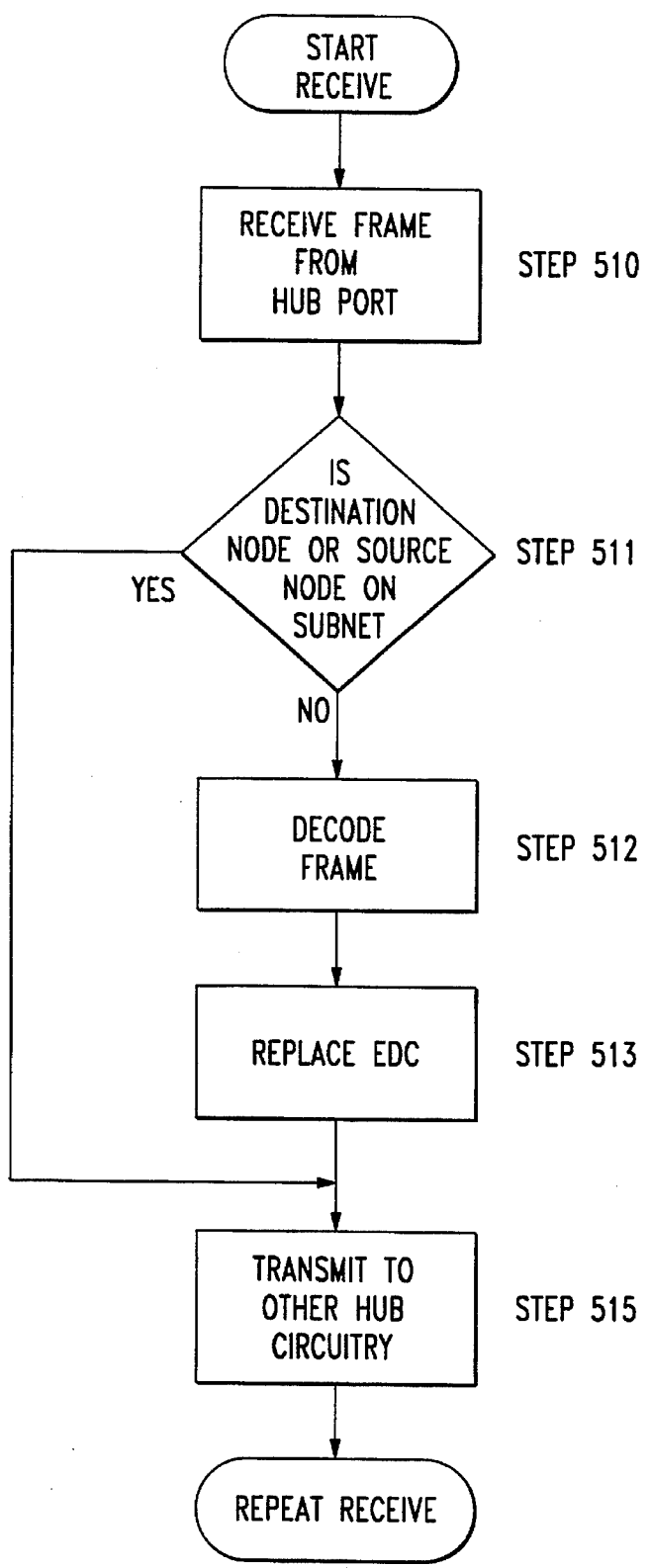
FIG. 5b is a flow chart of the steps of the inventive method for receiving a message frame in the gate keeper circuit from a node of a subnetwork within a ring.

The message frame, whether encoded or not, circulates through each node 204a–204d of the subnetwork 201a until the message frame is either removed by a node, or it returns to the port 201a. FIG. 5b is a flow chart of the steps of the inventive method for receiving a message frame in the gate keeper circuit 301a from port 201a. The message frame is transmitted to the gate keeper circuit 301a (STEP 510) to again determine whether the message frame was intended for any node 204a–204d within the subnetwork 201a or sourced by a node on the subnetwork (STEP 511). If the frame was not intended for, or sourced by, any of the nodes 204a–204d within the subnetwork 206a, then the message frame is decoded (STEP 512) and the EDC is replaced (STEP 513). Otherwise, the message frame is not decoded. The message frame is then conveyed from the gate keeper circuit 301a to the other hub circuits 406 (STEP 515). The other hub circuitry then forwards the message frame to the next gate keeper circuit 301b, where the process is repeated.

Figure 6:
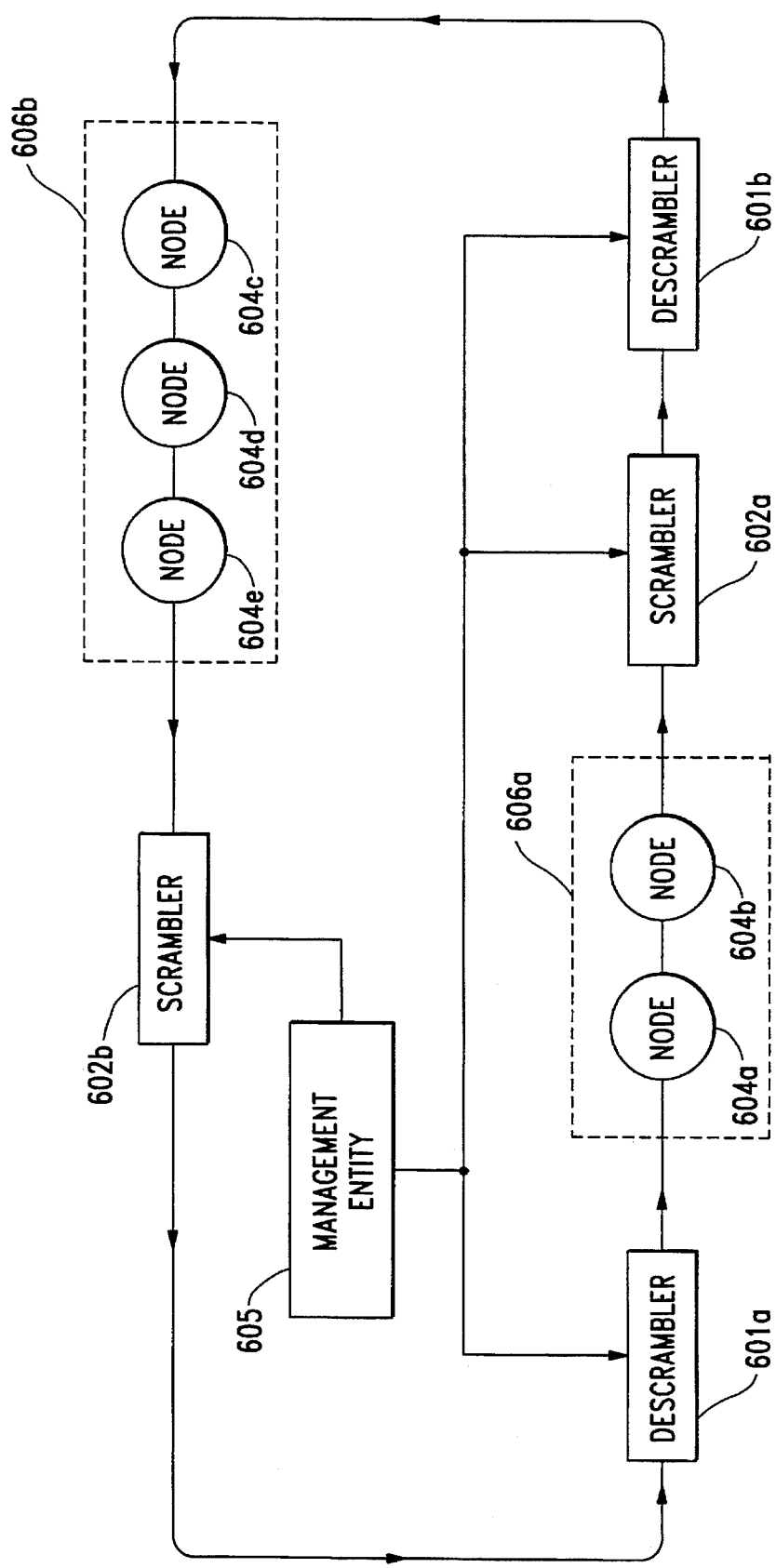
FIG. 6 is an illustration of the present invention as applied to a ring network in which hubs are not included.

FIG. 6 is an illustration of the present invention as applied to a ring network in which hubs are not included. In the application of the present invention illustrated in FIG. 6, a descrambler circuit 601 is coupled to the ring network. Any number of adjacent elements (such as adjacent nodes 604) comprising a first subnetwork 606a are serially connected to the ring network downstream from the descrambler circuit 601. A scrambler circuit 602 is coupled to the ring network downstream from the first subnetwork 606a of adjacent elements. This configuration of descrambler circuit 601, subnetwork 606, and scrambler circuit 602 may be repeated any number of times around the ring network. Each descrambler circuit 601 determines if message frames are intended for any of the nodes 604 included in the subnetwork 606 defined by those adjacent elements coupled between the descrambler circuit 601 and the scrambler circuit 602. If the message frames are intended for at least one of the nodes 604 included within the subnetwork 606, then the message frame is decoded. However, if the message frame is not intended for any of the nodes 604 within the subnetwork 606, then the message frame is not decoded and none of the nodes 604 within the subnetwork 606 can read the message frame. The scrambler circuit 602 determines whether the message frames that it receives are to be encoded or not, and encodes message frames that are not already encoded.

One means for determining whether the message frames are encoded is to determine where the message frame originated and to where the message frame is destined. If the message frame neither originated nor was destined for any of the nodes 604 in the subnetwork 606 from which it has just come, it is presently encoded and need not be encoded by the scrambler circuit 602. Otherwise, it is not presently encoded and the scrambler circuit must encode the message frame. The descrambler circuit 601 is as described with reference to the preferred embodiment of the present invention, with the exception that a PRBS generator, as included within the gate keeper circuit 301 of FIG. 4, would not be feasible. Rather each scrambler and descrambler circuit 602, 601 would need to be in communication with a management entity 605. The management entity 605 would provide the code with which each scrambler and descrambler 602, 601 would encode and decode the message frame. In an alternative embodiment, the scrambler circuit 602, and the descrambler circuit 601 may be substituted one for the other such that the message frame is encoded upon leaving the subnetwork rather than upon entering the subnetwork, depending upon the security concerns relevant to the particular network.

The above description and example of the present invention should make clear that the present invention provides a fast, inexpensive, and easily implemented low-level security system on a ring network. The present invention selectively scrambles message frames based upon the origin and destination (i.e., either the destination as designated by the address, the destination based upon the fact that information is intended for all nodes, or the destination based upon the nature of the message) of the message frame, allowing the gate keeper circuits 301 to control the encoding and decoding function.

A number of embodiments of the present invention have been described. Nevertheless, it will be understood that various modifications may be made without departing from the spirit and scope of the invention. For example, a subnetwork may include elements other than nodes as defined herein. Also, elements other than those discussed herein may be included in the ring network. Furthermore, the protocol of the ring may vary significantly from that described herein. For example, the ring network may be a token, slotted, or buffer insertion ring network, or linear topologies with similar characteristics. Messages may not be sent in frames, switches may be provided in the network which cause elements of the network to be bypassed in accordance with instructions included in the message frame, hubs may vary significantly from those described herein, etc. Also, while the description above describes a system in which an error detection code is part of the message frame, such an error detection code need not be part of the message frame. Accordingly, it is to be understood that the invention is not to be limited by the specific illustrated embodiment, but only by the scope of the appended claims.

I claim:

1. A network security system for use in a ring network having at least one node on a subnetwork, including:
   (a) encoding means, coupled between the ring network and the subnetwork, for receiving data from the ring network and determining if the received data is not intended to be received by a node within the subnetwork, encoding at least part of the data if so determined, and transmitting the resulting received data over the subnetwork to the at least one node;
   (b) decoding means, coupled between the ring network and the subnetwork, for receiving data from the at least one node, at least some of which was previously transmitted by the encoding means to the subnetwork, determining if such received data was previously encoded by the encoding means, and decoding the received data if so determined.

2. A network security system for use in a ring network having at least one hub coupled thereto, at least one of said hubs having at least one active subnetwork connected thereto, the network security system including:
   (a) encoding means, coupled between one of said hubs having at least one active subnetwork and one of the active subnetworks, for receiving data and determining if the received data is to be encoded based upon the destination and source of the received data, encoding at least part of the data if so determined, and transmitting the resulting data over the active subnetwork;
   (b) decoding means, coupled between one of said hubs having at least one active subnetwork and the one of the active subnetworks receiving data, at least some of which was previously transmitted by the encoding means to the subnetwork, for receiving data from the active subnetwork, determining if the received data was previously encoded by the encoding means based upon the destination and source of the received data, and decoding the received data if so determined.

3. The network security system of claim 2, wherein each encoding means corresponds to a unique decoder means.

4. The network security system of claim 3, further including:
   (a) an address detection means, coupled to the encoding means and to the decoder means, for receiving data and determining the destination and source of the data;
   (b) an error correction code generator means, coupled to the encoding means, for generating an error correction code after encoding and decoding the data.

5. The network security system of claim 4, wherein:
   (a) the encoding means encodes selected components of the data by Exclusive-ORing such components with an encoding word; and
   (b) the decoding means decodes the encoded components by Exclusive-ORing such components with the encoding word.

6. The network security system of claim 5, wherein the encoding means further includes a pseudo-random binary sequence generator means, coupled to the encoding means and to the decoder means, for generating the encoding word.

7. The network security system of claim 6, wherein the encoding word is a pseudo-random binary sequence.

8. A network security system for securing transmission of data within a ring network having at least one hub having at least one port to which at least one node is coupled, the ring network having at least two nodes, the network security system including:
   a gate keeper circuit associated with at least one active port of at least one hub, coupled between the associated hub and the associated port, for determining if the data being transmitted to the associated port from the associated hub is intended for at least one of the nodes coupled to the associated port, and if not intended for at least one of the nodes coupled to the associated port, then encoding at least part of the transmitted data, and otherwise not encoding any of the transmitted data, and for determining if the data being transmitted from the associated port to the associated hub was intended for, or originated within, at least one of the nodes coupled to the associated port, and if not then decoding the encoded part of the transmitted data, and otherwise not decoding any of the transmitted data.

9. The network security system of claim 8, wherein the gate keeper circuit further includes:
   (a) an address detection means, coupled to the associated port, for receiving the data transmitted from the associated hub to the associated port and determining the destination and source of the transmitted data, and for receiving the data transmitted from the associated port to the associated hub and determining the destination and the source of the transmitted data;
   (b) an encoding means, coupled to the address detection means, for encoding at least part of the transmitted data if neither the source nor the destination of the data transmitted from the associated hub to the associated port is at least one of the nodes coupled to the associated port;
   (c) a decoding means, coupled to the address detection means, for decoding each part of the data encoded by the encoding means and transmitted from the associated port to the associated hub if neither the source nor the destination of the transmitted data is at least one of the nodes coupled to the associated port;
   (d) an error correction code generator means, coupled to the encoding means and to the decoding means, for generating an error correction code for the data transmitted from the associated hub to the associated port after the encoding of the transmitted data, and for generating an error correction code for the data transmitted from the associated port to the associated hub after the decoding of the transmitted data.

10. The network security system of claim 9, wherein the gate keeper circuit further includes:
    an error detection means, coupled to the error generator means, the error correction code generator means, and to the associated port, for receiving the data transmitted from the associated port to the associated hub, detecting errors in the received data, and transmitting an indication of the error to the error correction code generator means;

and wherein the error correction code generator means generates an erroneous error correction code for the data transmitted from the associated port to the associated hub after the decoding of the transmitted data, if the error detection means transmits an indication of an error to the error correction code generator means.

11. The network security system of claim 9, wherein the gate keeper circuit further includes:

an error detection means, coupled to the error generator means, the error correction code generator means, and to the associated hub, for receiving the data transmitted from the associated hub to the associated port, detecting errors in the received data, and transmitting an indication of the error to the error correction code generator means;

and wherein the error correction code generator means generates an erroneous error correction code for the data transmitted from the associated hub to the associated port after the encoding of the transmitted data, if the error detection means transmits an indication of an error to the error correction code generator means.

12. The network security system of claim 9, wherein:

(a) the encoding means encodes selected components of the transmitted data by Exclusivec-ORing the transmitted data with an encoding word; and (b) the decoding means decodes the encoded components the by Exclusive-ORing the transmitted data with the encoding word.

13. The network security system of claim 12, wherein the encoding word is a pseudo-random binary sequence.

14. A method for securing transmissions of data within a ring network having at least one hub coupled thereto, at least one of said hubs having at least one port, the at least one port being coupled to the ring network and having an active subnetwork connected to such port, including the steps of:

(a) receiving data within a port;

(b) determining whether the received data has a destination or source within the active subnetwork connected to the port;

(c) if the data does not have a destination or source within such active subnetwork, then encoding at least part of the data, and otherwise, not encoding the data;

(d) circulating the data through the active subnetwork;

(e) receiving the circulated data in the port;

(f) determining whether the circulated data had a destination or source within the active subnetwork connected to the port;

(g) if the data did not have a destination or source within such active subnetwork, then decoding the encoded part of the data.

15. The method of claim 14, wherein step (g) comprises repeating steps (a) through (g) until the data is circulated through the active subnetwork having the destination of the data.

16. A network security system for use in a ring network having at least one node on a subnetwork, comprising:

(a) an encoder circuit coupled between the ring network and the subnetwork, for receiving data from the ring network and determining if the received data is not intended to be received by a node within the subnetwork, encoding at least part of the data if so determined, and transmitting the resulting received data over the subnetwork to the at least one node; and (b) a decoder circuit coupled between the ring network and the subnetwork, for receiving data from the at least one node, at least some of which was previously transmitted by the encoder circuit to the subnetwork, determining if such received data was previously encoded by the encoder circuit, and decoding the received data if so determined.

* * * * *